United States Patent
Gaither

(10) Patent No.: US 10,833,305 B2
(45) Date of Patent: Nov. 10, 2020

(54) ROADWAY HEAT ABSORPTION SYSTEM FOR BATTERY HEATING

(71) Applicant: Toyota Motor Engineering & Manufacturing North America, Inc., Plano, TX (US)

(72) Inventor: Geoffrey D. Gaither, Brighton, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 183 days.

(21) Appl. No.: 16/102,568

(22) Filed: Aug. 13, 2018

(65) Prior Publication Data
US 2020/0052268 A1 Feb. 13, 2020

(51) Int. Cl.
| | |
|---|---|
| *H01M 2/12* | (2006.01) |
| *H01M 10/48* | (2006.01) |
| *H01M 10/615* | (2014.01) |
| *H01M 10/625* | (2014.01) |

(52) U.S. Cl.
CPC ....... *H01M 2/1282* (2013.01); *H01M 10/486* (2013.01); *H01M 10/615* (2015.04); *H01M 10/625* (2015.04); *H01M 2200/20* (2013.01)

(58) Field of Classification Search
CPC ............. H01M 10/486; H01M 10/615; H01M 10/625; H01M 10/635; H01M 2200/20; H01M 2220/20; H01M 2/1282
See application file for complete search history.

(56) References Cited

U.S. PATENT DOCUMENTS

| | | | |
|---|---|---|---|
| 5,573,090 A | 11/1996 | Ross | |
| 5,620,057 A * | 4/1997 | Klemen | B60L 50/64 180/68.5 |
| 6,831,221 B2 * | 12/2004 | Hulen | B60L 5/005 136/253 |
| 7,878,283 B2 | 2/2011 | Richter et al. | |
| 8,220,569 B2 | 7/2012 | Hassan | |
| 8,344,526 B2 | 1/2013 | Bhat et al. | |
| 8,924,056 B2 | 12/2014 | Chorian et al. | |
| 9,153,845 B2 | 10/2015 | Tanaka et al. | |
| 9,180,750 B2 | 11/2015 | Kishita et al. | |

(Continued)

FOREIGN PATENT DOCUMENTS

| | | | |
|---|---|---|---|
| DE | 102006035759 | 2/2008 | |
| EP | 2546904 A1 * | 1/2013 | .......... H01M 10/625 |

*Primary Examiner* — Adam A Arciero
(74) *Attorney, Agent, or Firm* — Snell & Wilmer LLP

(57) ABSTRACT

Methods and systems for warming a battery of a vehicle. The battery is configured to power a motor of the vehicle. The system includes a vent located below the battery and within an opening in the bottom surface of the vehicle, the vent configured to be in an open state or a closed state, the opening being substantially open when the vent is in the open state and the opening being substantially covered when the vent is in the closed state. The system includes an electronic control unit (ECU) coupled to the vent and the battery and configured to determine whether a temperature of the battery is below a threshold temperature, and cause the vent to move from the closed state to the open state when the temperature of the battery is below the threshold temperature to allow the battery to directly absorb heat radiated from the ground surface.

14 Claims, 8 Drawing Sheets

(56) References Cited

U.S. PATENT DOCUMENTS

| | | |
|---|---|---|
| 9,496,730 B2 | 11/2016 | Gallegos et al. |
| 9,522,379 B2 | 12/2016 | McAlister |
| 9,882,249 B2 | 1/2018 | Retti |
| 2008/0245590 A1 | 10/2008 | Yonak et al. |
| 2009/0071178 A1* | 3/2009 | Major .................. B60L 50/52 |
| | | 62/239 |
| 2011/0104530 A1 | 5/2011 | Muller et al. |
| 2015/0013367 A1* | 1/2015 | Carpenter ......... B60H 1/00278 |
| | | 62/222 |

* cited by examiner

ROADWAY HEAT ABSORPTION SYSTEM FOR BATTERY HEATING

BACKGROUND

1. Field

This specification relates to a system and a method for absorbing ambient heat for heating a battery of a partially electric vehicle or a fully electric vehicle.

2. Description of the Related Art

Conventional vehicles use internal combustion engines to propel the vehicle by combusting gasoline. Partially electric vehicles (e.g., hybrid vehicles) or fully electric vehicles use batteries storing electricity to power a motor used for propelling the vehicle. Typically, these batteries (e.g., lithium-ion batteries) achieve optimum efficiency and charging when the batteries are between 5 degrees and 45 degrees Celsius. Damage may even occur when attempting to charge the batteries below freezing temperatures. Operating the electric vehicle outside the temperature ranges of 5 degrees Celsius and 45 degrees Celsius may result in a sub-optimal operating and/or charging efficiency. Operating the electric vehicle in sub-optimal conditions may result in an increased cost of operation and may increase the overall wear on the electric vehicle. Therefore, there is a need for a system and a method for heating the batteries of an electric vehicle.

SUMMARY

What is described is a system for warming the battery of a vehicle. The system includes a battery configured to power a motor of the vehicle, the battery located within the vehicle and proximal to a bottom surface of the vehicle. The system also includes a vent located below the battery and within an opening in the bottom surface of the vehicle, the vent configured to be in an open state or a closed state, the opening being substantially open when the vent is in the open state and the opening being substantially covered when the vent is in the closed state. The system also includes an electronic control unit (ECU) coupled to the vent and the battery and configured to determine whether a temperature of the battery is below a threshold temperature, and cause the vent to move from the closed state to the open state when the temperature of the battery is below the threshold temperature to allow the battery to directly absorb heat radiated from the ground surface.

Also described is a method for warming a battery of an electric vehicle. The method includes detecting, by a battery temperature sensor connected to the battery, a temperature of the battery. The method also includes determining, by an electronic control unit (ECU) connected to the battery temperature sensor, whether the temperature of the battery is below a threshold temperature. The method also includes moving, by a vent coupled to the ECU, from a closed state to an open state when the temperature of the battery is below the threshold temperature, the vent allowing the battery to directly absorb heat radiated from the ground surface when the vent is in the open state.

Also described is a vehicle. The vehicle includes a bottom surface. The vehicle also includes a battery configured to power a motor of the electric vehicle, the battery located within the electric vehicle and proximal to the bottom surface. The vehicle also includes a vent located below the battery and within an opening in the bottom surface, the vent configured to be in an open state or a closed state, the opening being substantially open when the vent is in the open state and the opening being substantially covered when the vent is in the closed state. The vehicle also includes an electronic control unit (ECU) coupled to the vent and the battery and configured to determine whether a temperature of the battery is below a threshold temperature, and cause the vent to move from the closed state to the open state when the temperature of the battery is below the threshold temperature to allow the battery to directly absorb outside heat.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for heating a battery of an electric vehicle without generating heat by the vehicle. Instead, the roadway heat absorption system uses the heat emitted from the environment surrounding the electric vehicle to heat the battery. In particular, the ground beneath the electric vehicle may radiate heat, which may be absorbed directly by the battery of the electric vehicle.

The system uses a vent located on a bottom surface of the electric vehicle, which may be in an open state or a closed state. When in the open state, the battery of the vehicle is directly exposed to the ground beneath the vehicle, and the battery may directly absorb the heat radiated from the ground. When in the closed state, the battery of the vehicle is covered and protected. By leveraging the existing ambient heat from the ground beneath the electric vehicle, no additional energy (either stored in the vehicle or received from another power source) is used to heat the battery. This results in an efficient use of energy in order to maintain the temperature of the battery.

The systems, vehicles, and methods described herein automatically determine when to open the vent to allow the battery to be heated. By ensuring the battery is maintained within a particular temperature range, the charging efficiency and operational efficiency of the electric vehicle is optimized. When the battery of an electric vehicle is outside of the particular temperature range, operating efficiency and charging efficiency may be reduced.

Figure 1A:
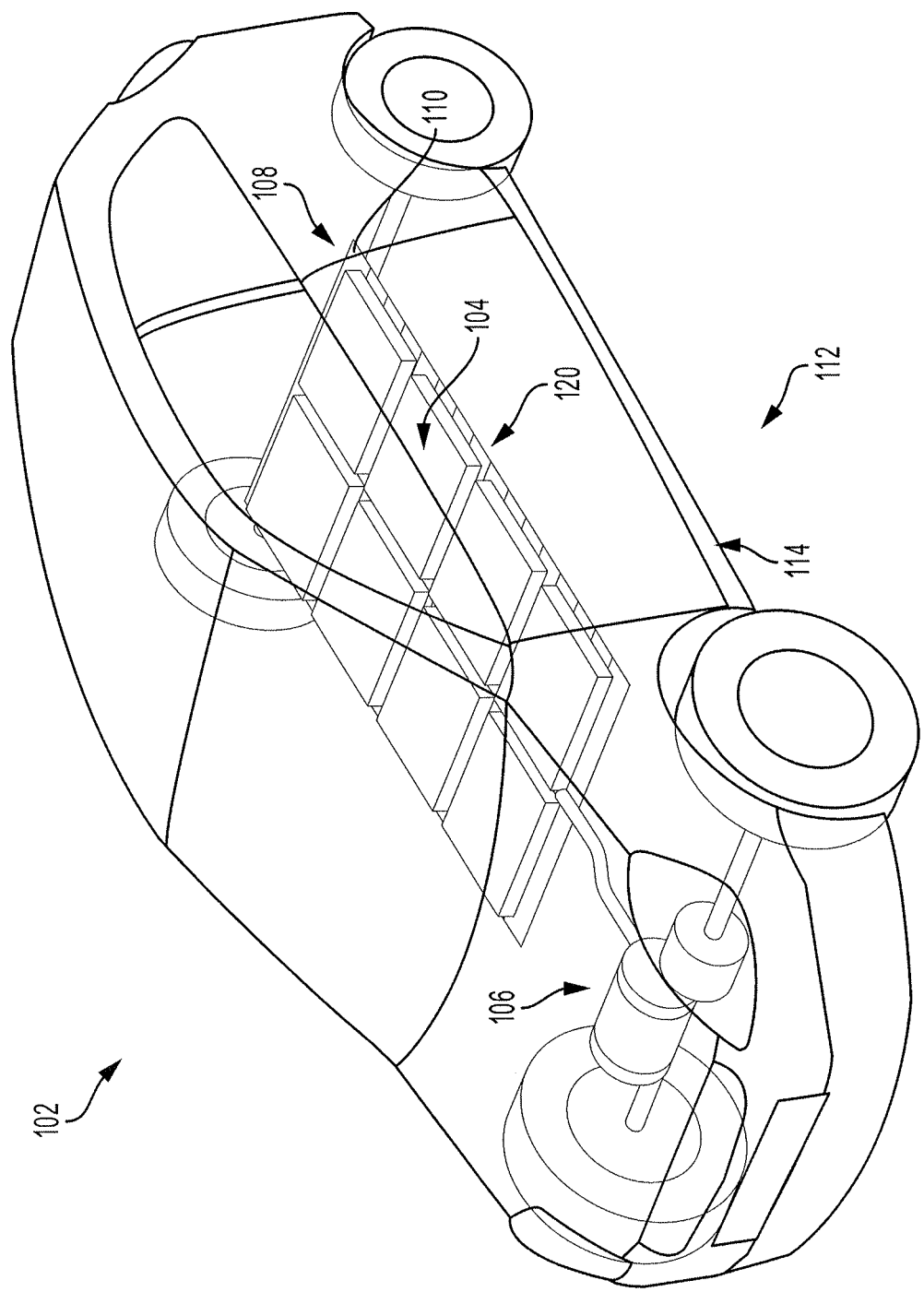
FIGS. 1A-1D illustrate different views of a vehicle having the roadway heat absorption system, according to various embodiments of the invention.

FIG. 1A illustrates a vehicle having the roadway heat absorption system. The vehicle 102 is an electric vehicle powered by a battery 104. The vehicle 102 may be a partial electric vehicle, such as a hybrid vehicle or a plug-in hybrid vehicle, which also has an internal combustion engine in addition to a motor 106. The vehicle 102 may be a fully electric vehicle which only has a motor 106 to propel the vehicle 102 forward.

The battery 104 may be one or more batteries connected to each other and to the motor 106 to power the motor 106. The battery 104 may also provide power to other electrical components of the vehicle 102. The battery 104 may be any kind of battery, for example, a lithium-ion battery. The battery 104 may be located proximal to the bottom side (or bottom surface) 114 of the vehicle 102. That is, the battery 104 may be located beneath one or more passenger seats and/or beneath a cargo area of the vehicle 102.

The battery 104 is separated from the ground surface 112 by a vent 108. The vent 108 is located on the bottom side 114 of the vehicle 102 and is located within an opening 120 that is located on the bottom side 114 of the vehicle 102. The vent 108 includes a plurality of panels (or slats) 110 which may be adjusted to move the vent 108 between an open state and a closed state. When in the open state, the vent 108 exposes the battery 104 to the ground surface 112 below the vehicle 102 so that the battery 104 may directly absorb the heat emitted from the ground surface 112. When in the closed state, the vent 108 prevents the battery 104 from being exposed to the ground surface 112 below the vehicle 102.

Figure 1B:
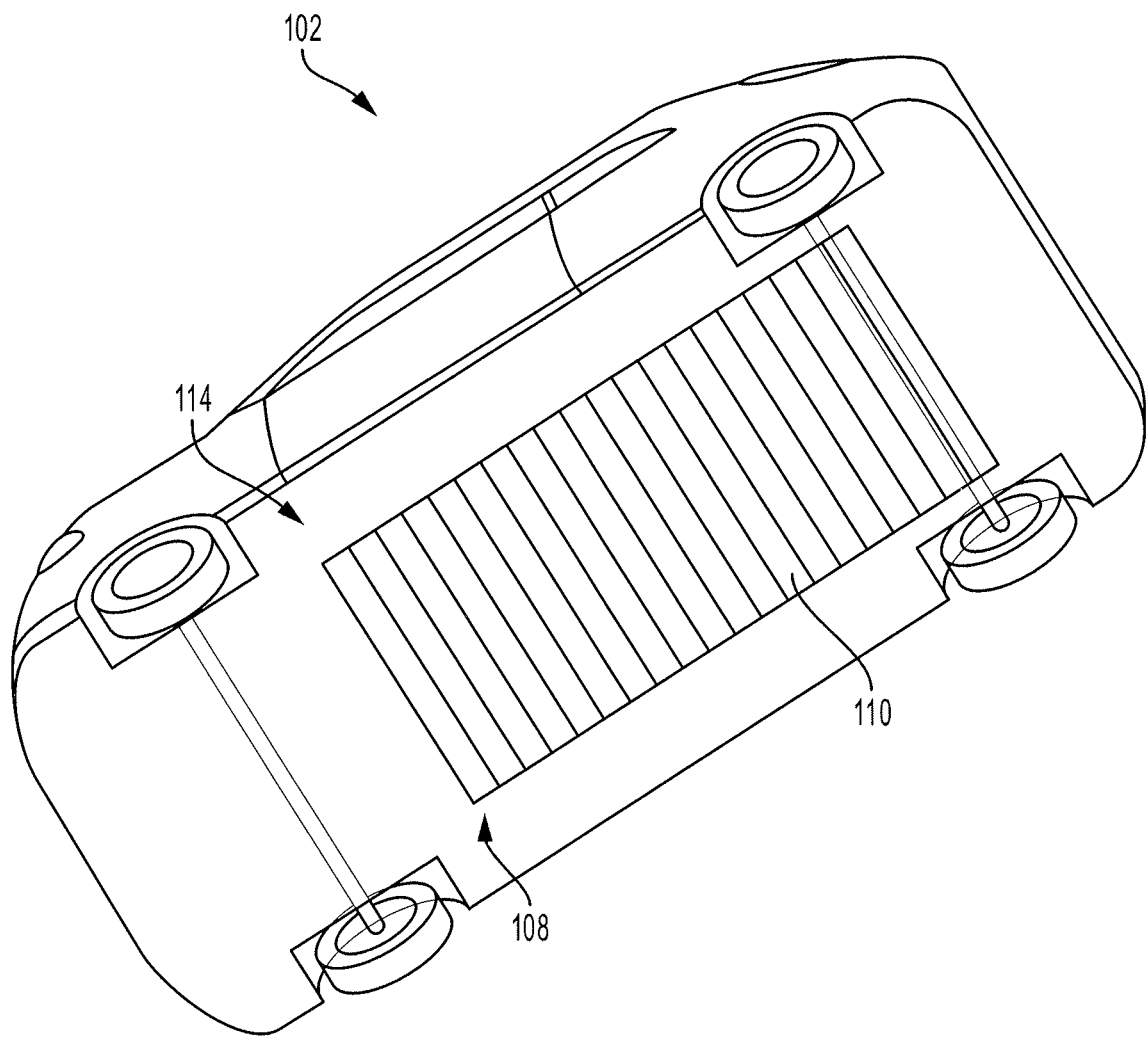

FIG. 1B illustrates a bottom view of the vehicle 102 with the vent 108 in a closed state. As shown in FIG. 1B, the bottom side 114 of the vehicle 102 includes a vent 108 having a plurality of panels 110. The vent 108 may substantially span a width of the vehicle 102. While the panels 110 are shown as spanning the width of the vehicle 102, the panels 110 may alternatively be arranged to span the length of the vehicle 102. In other embodiments, the panels 110 may be in any arrangement or orientation. The vent 108 is illustrated as being substantially rectangular in shape, but any other shape, such as a circle, or oval may be used.

Figure 1C:
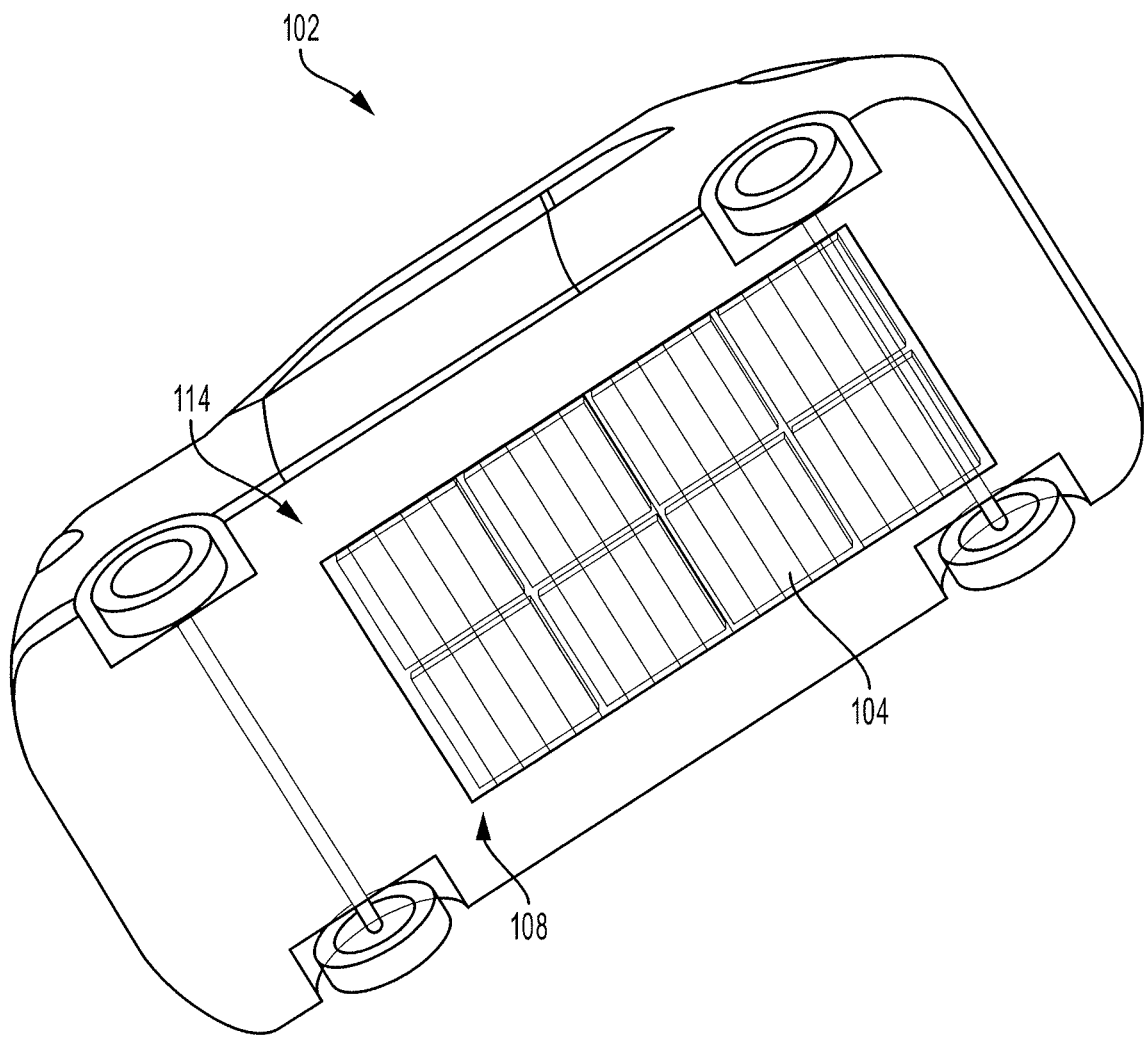

FIG. 1C illustrates the bottom view of the vehicle 102 with the vent 108 in an open state. While in the open state, the vent 108 exposes the battery 104 located above the vent 108 and inside the vehicle 102.

Figure 1D:
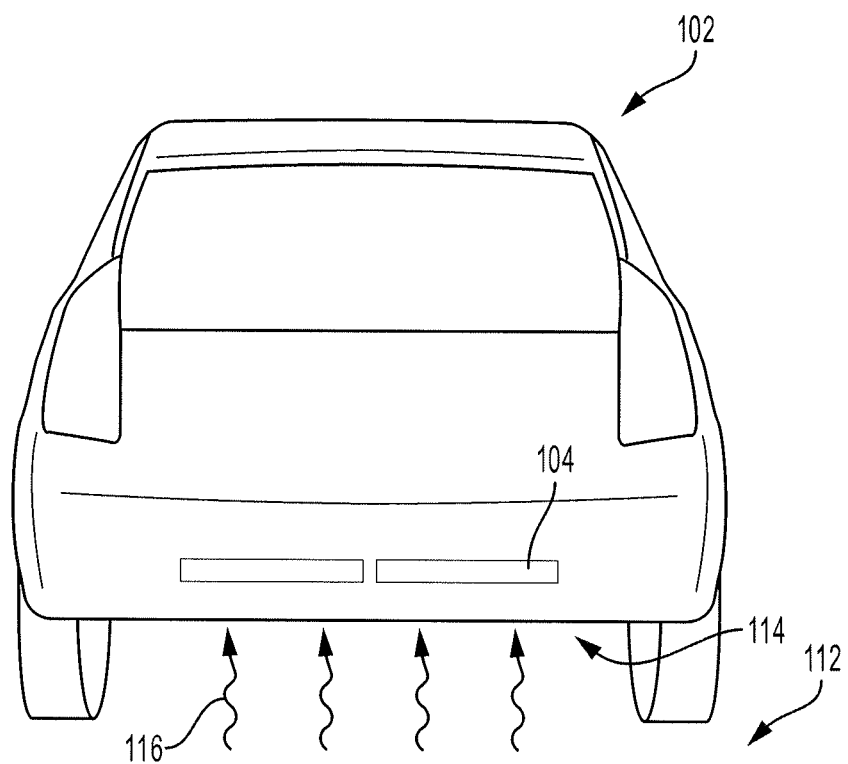

FIG. 1D illustrates a rear view of the vehicle 102 with the vent 108 in the open state shown in FIG. 1C. When in the open state, the battery 104 is allowed to absorb heat 116 emitted from the ground surface 112 below the vehicle 102. The ground surface 112 may be the ground surface of a garage, a parking lot, or the open road.

In some embodiments, a supplemental heat source may be located on top of the ground surface 112 or embedded within the ground surface 112 and may emit heat for the battery 104 to absorb. For example, a portable heating pad may be plugged into an electrical outlet in a parking lot, and the battery 104 may absorb the heat emitted from the portable heating pad while the vehicle 102 is parked. This may be particularly useful when the outside temperature is low (e.g., when it is snowing). Without the external heating source, the battery 104 may decrease in temperature while the vehicle 102 is parked, and electrical energy from the vehicle 102 may later be used to raise the temperature of the battery 104 to an energy efficient temperature.

Figure 2A:
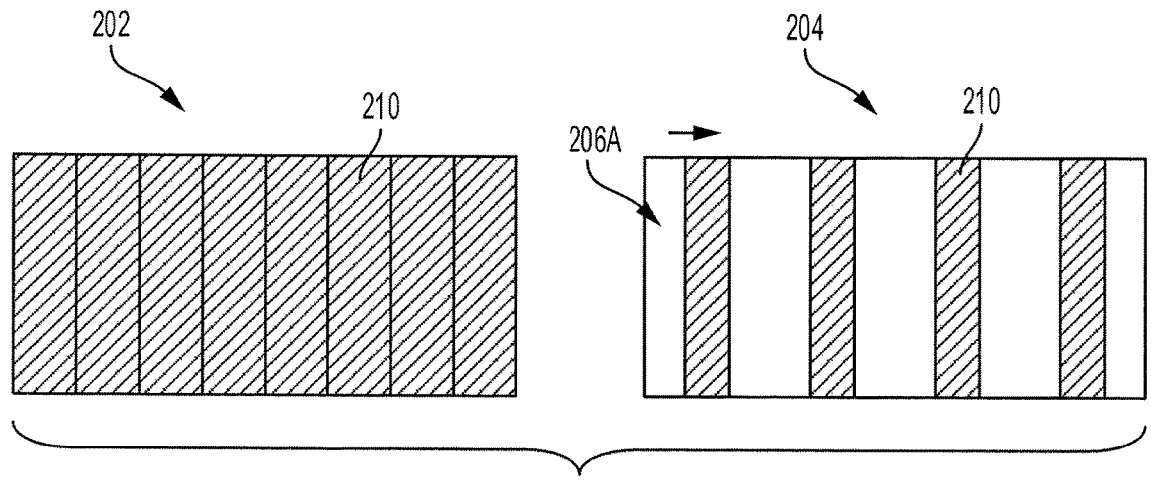
FIGS. 2A-2C illustrate different types of vents used in the roadway heat absorption system, according to various embodiments of the invention.
Figure 2B:
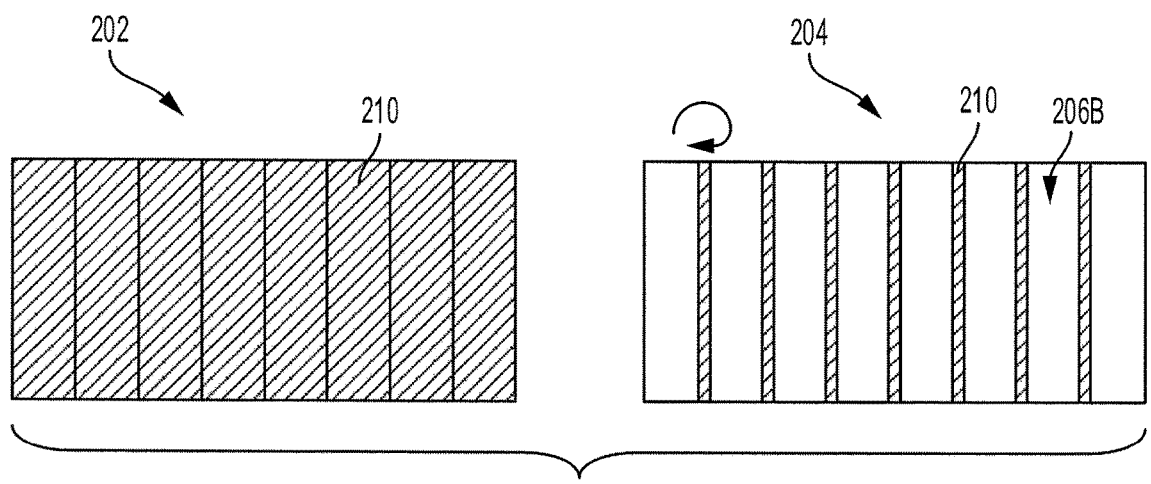
Figure 2C:
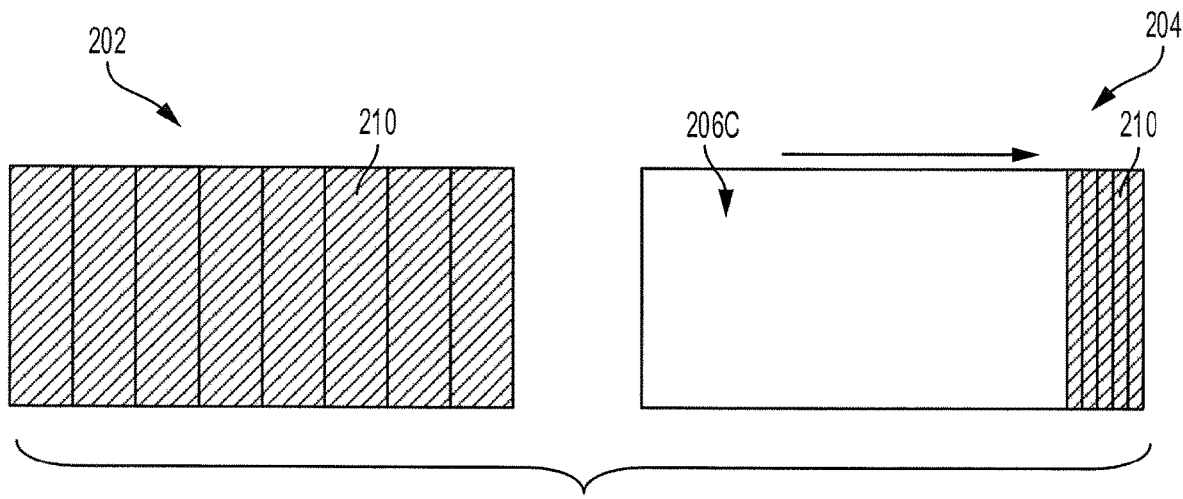

FIGS. 2A-2C illustrate various possible embodiments of vents (e.g., vent 108) to be used in the roadway heat absorption system.

FIG. 2A illustrates a sliding vent where the panels 210 slide when the vent is moved from the closed state 202 to the open state 204. When in the open state 204, there are a plurality of openings 206A that allow heat emitted from the ground surface (e.g., ground surface 112) to be absorbed by the battery (e.g., battery 104). In the open state 204, the panels 210 may overlap to create the openings 206A.

FIG. 2B illustrates a rotating vent where the panels 210 rotate when the vent is moved from the closed state 202 to the open state 204. When in the open state 204, there are a plurality of openings 206B that allow heat emitted from the ground surface to be absorbed by the battery.

FIG. 2C illustrates a sliding vent where the panels 210 are connected to each other and collapse into a compact form when the vent is moved from the closed state 202 to the open state 204. When in the open state 204, there is a single opening 206C that allows heat emitted from the ground surface to be absorbed by the battery. The panels 210 may be connected and arranged in a pleated manner so that the panels may fold onto each other, similar to the bellows of an accordion.

The opening 206C illustrated in FIG. 2C may be greater in area than the openings 206B illustrated in FIG. 2B, as the individual panels 210 may be further compressed when pleated (as in FIG. 2C) than when rotated (as in FIG. 2B). The openings 206B illustrated in FIG. 2B may be greater in area than the openings 206A illustrated in FIG. 2A, as the individual panels 210 in the open state 204 may have a smaller cross sectional area when the panels are rotated (as in FIG. 2B) than when the panels are slid and overlapped (as in FIG. 2A).

Figure 3:
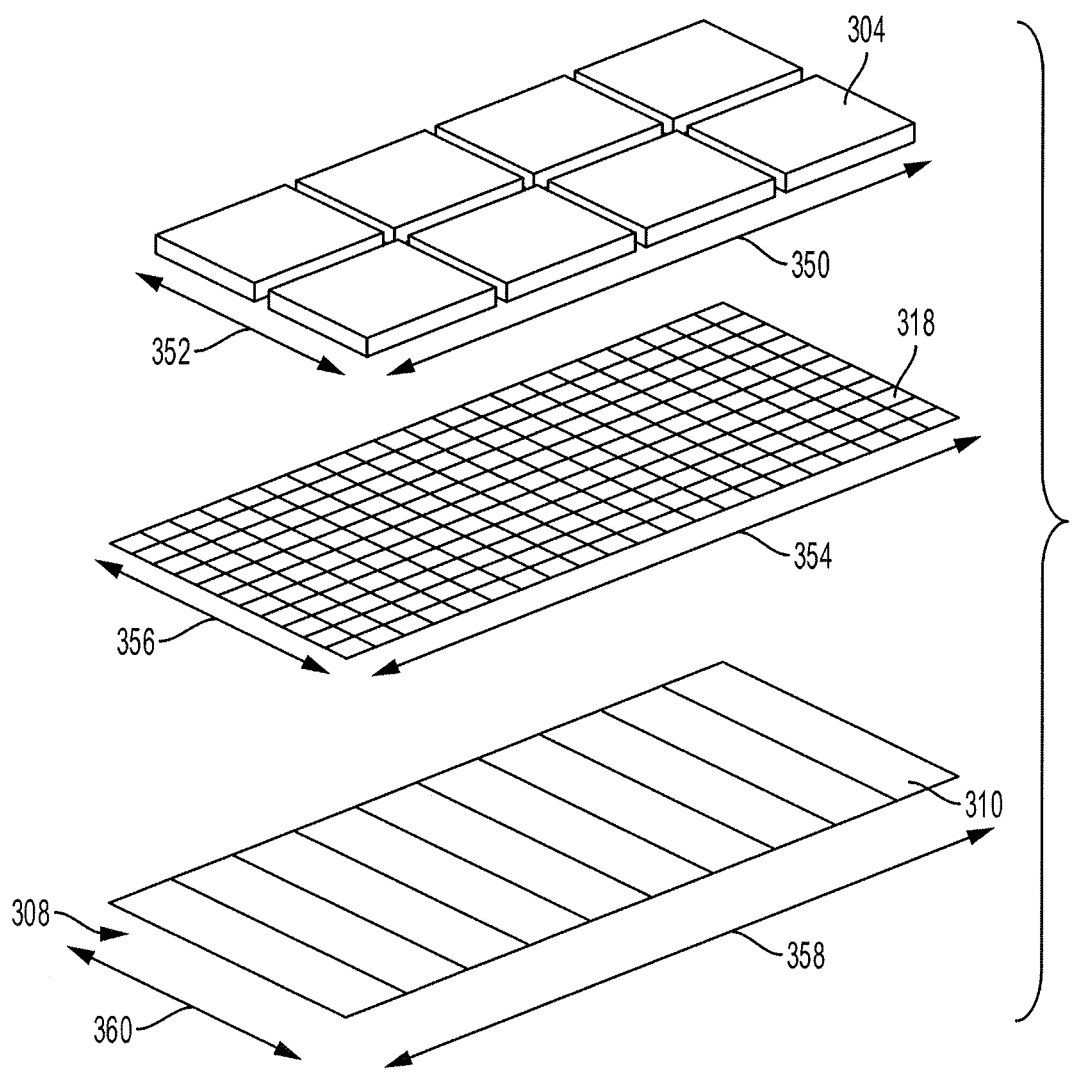
FIG. 3 illustrates a protective screen used in the roadway heat absorption system, according to various embodiments of the invention.

FIG. 3 illustrates a protective screen, which protects the battery from debris when the vent is in the open state.

The battery 304 (similar to battery 104) may be protected by a screen 318 located below the battery 304 and above the vent 308 (similar to vent 108). Accordingly, the screen 318 shown in FIG. 3 is located inside of the vehicle. In some embodiments, the screen 318 is located below the vent 308 and located outside of the vehicle.

The screen 318 may be made of a mesh having openings that are large enough to allow heat to pass through from the ground surface (e.g., ground surface 112) to the battery, but small enough to prevent debris from entering the vehicle and/or contacting the battery 304 when the vent 308 is in the open state. The screen 318 may be retractable and/or collapsible. In some embodiments, the screen 318 may be rolled into a cylindrical roll such that the screen 318 does not cover the battery 304. In some embodiments, the battery 304 may absorb heat emitted from the ground surface even when the vehicle is in motion, and the screen 318 is deployed to protect the battery 304 when the vehicle is in motion, and the screen 318 is retracted when the vehicle is stationary and there is less risk of debris from the road making contact with the battery 304.

The screen 318 may have a length 354 that is longer than the length 350 of the battery 304. The screen 318 may also have a width 356 that is wider than the width 352 of the battery 304. The screen 318 may have a length 354 that is longer than the length 358 of the vent 308. The screen 318 may also have a width 356 that is wider than the width 360 of the vent 308. The relative length and width of the battery 304 and the vent 308 may be in any combination. That is, the battery 304 may be wider and longer than the vent 308 or the vent 308 may be wider and longer than the battery 304. An advantage to the battery 304 being wider and longer than the vent 308 is that the battery 304 may not be easily removed from the vehicle when the vent 308 is open and the screen 318 is retracted. An advantage to the vent 308 being wider and longer than the battery 304 is that the battery 304 may have a maximum possible amount of surface area exposed to the heat emitted from the ground surface.

Figure 4:
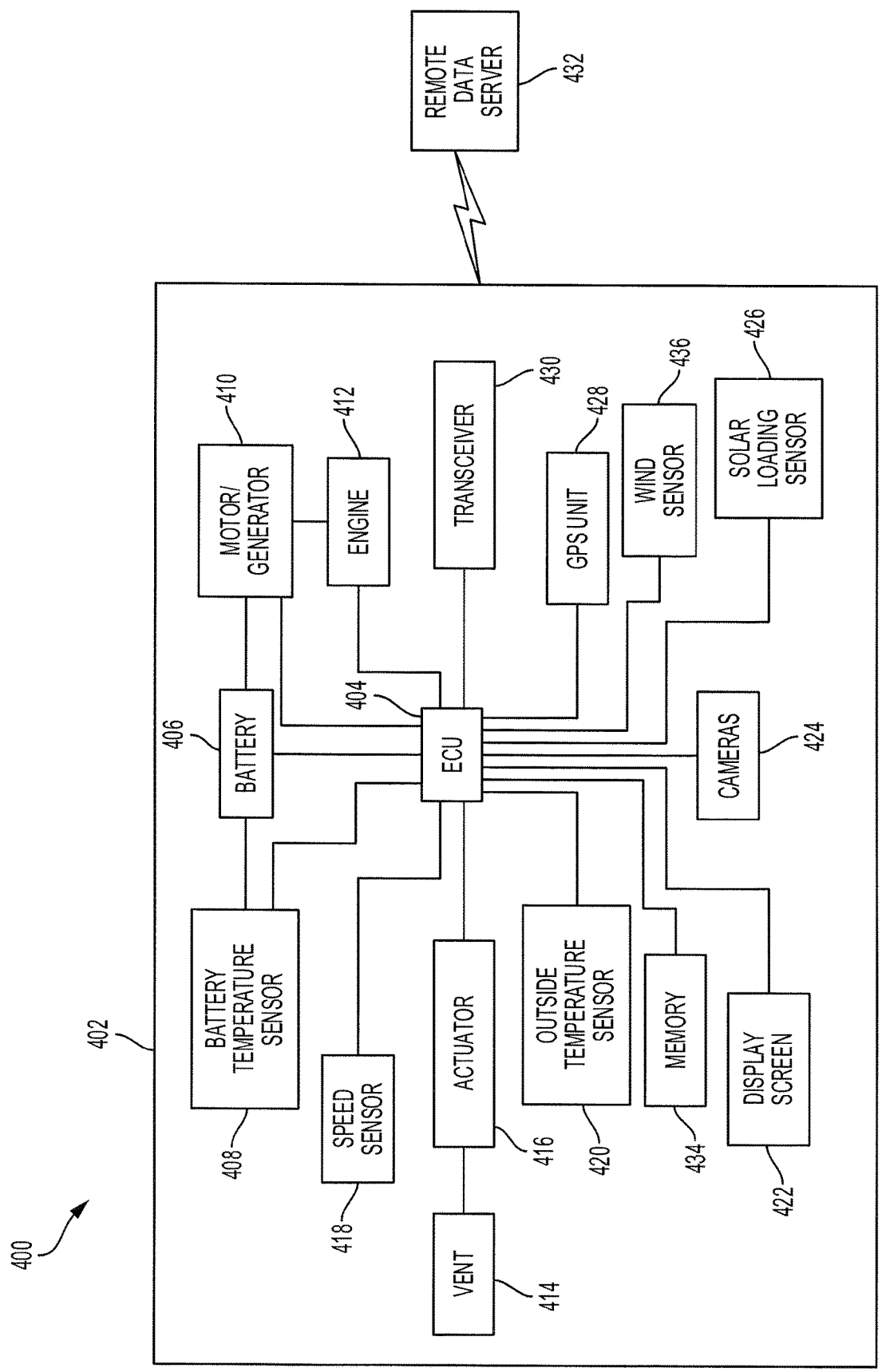
FIG. 4 illustrates a block diagram of the roadway heat absorption system, according to various embodiments of the invention.

FIG. 4 illustrates an example system 400, according to various embodiments of the invention. The system includes a vehicle 402 (e.g., the vehicle 102). The vehicle 402 may have an automatic or manual transmission. The vehicle 402 is a conveyance capable of transporting a person, an object, or a permanently or temporarily affixed apparatus. The vehicle 402 may be a self-propelled wheeled conveyance, such as a car, a sports utility vehicle, a truck, a bus, a van or other motor or battery driven vehicle. For example, the vehicle 402 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 402 may be a semi-autonomous vehicle or an autonomous vehicle. That is, the vehicle 402 may be self-maneuvering and navigate without human input. An autonomous vehicle may use one or more sensors and/or a navigation unit to drive autonomously.

The vehicle 402 may be powered by an engine 412 and/or a motor/generator 410. The motor/generator 410 may be powered by a battery 406 (e.g., battery 104). The battery 406 is connected to a battery temperature sensor 408 which is configured to detect a current temperature of the battery 406.

The system 400 also includes one or more computers or electronic control units (ECUs) 404, appropriately programmed, to control one or more operations of the vehicle. The one or more ECUs 404 may be implemented as a single ECU or in multiple ECUs. The ECU 404 may be electrically coupled to some or all of the components of the vehicle. In some embodiments, the ECU 404 is a central ECU configured to control one or more operations of the entire vehicle. In some embodiments, the ECU 404 is multiple ECUs located within the vehicle and each configured to control one or more local operations of the vehicle. In some embodiments, the ECU 404 is one or more computer processors or controllers configured to execute instructions stored in a non-transitory memory 434.

The vehicle 402 includes a vent 414 (e.g., vent 108) that is configured to be in an open state to allow the battery 406 to absorb heat from the ground surface or a closed state to prevent the battery 406 from being exposed to the outside environment of the vehicle 402. The vent 414 may be moved from the open state to the closed state by an actuator 416. The actuator 416 is connected to the ECU 404, and the ECU 404 may instruct the actuator 416 to move the vent 414 from the closed state to the open state or from the open state to the closed state.

The vehicle 402 also includes an outside temperature sensor 420 configured to detect a temperature outside of the vehicle 402. The temperature outside of the vehicle 402 may be represented by outside temperature data. In many embodiments, the outside temperature sensor 420 is configured to detect the temperature of the ground surface below the vehicle 402 and/or the air temperature between the ground surface and the vent 414. When the outside temperature detected by the outside temperature sensor 420 exceeds the temperature of the battery 406 detected by the battery temperature sensor 408, the ECU 404 may instruct the actuator 416 to move the vent 414 from the closed state to the open state. When the outside temperature detected by the outside temperature sensor 420 ceases to exceed the temperature of the battery 406 detected by the battery temperature sensor 408, the ECU 404 may instruct the actuator 416 to move the vent 414 from the open state to the closed state.

The vehicle 402 also includes a wind sensor 436. The wind sensor 436 is configured to detect a wind speed experienced by the vehicle 402, which may affect the effective outside temperature. For example, while the temperature of the ground surface may be 106 degrees and the temperature of the battery 406 is 98 degrees, there may be sufficient wind present to cool the heat emitted from the ground surface such that the effective temperature experienced by the battery 406 is 96 degrees. The wind speed may be represented by wind data communicated to the ECU 404. The effective outside temperature may be determined by the ECU 404 based on the outside temperature data detected by the outside temperature sensor 420 and the wind data detected by the wind sensor 436.

The vehicle 402 also includes a solar loading sensor 426 configured to detect a current amount of sunlight. The current amount of sunlight may affect the effective outside temperature. For example, while the temperature of the ground surface is 72 degrees and the temperature of the battery 406 is 79 degrees, there may be sufficient sunlight present to heat the air above the ground surface such that the effective temperature experienced by the battery 406 is 82 degrees. The current amount of sunlight may be represented by sunlight data communicated to the ECU 404. The effective outside temperature may be determined by the ECU 404 based on the outside temperature data detected by the outside temperature sensor 420 and the sunlight data detected by the solar loading sensor 426. The ECU 404 may use any combination of outside temperature data, wind data, and sunlight data to determine the effective outside temperature.

When the effective outside temperature determined by the ECU 404 exceeds the temperature of the battery 406 detected by the battery temperature sensor 408, the ECU 404 may instruct the actuator 416 to move the vent 414 from the closed state to the open state. When the effective outside temperature determined by the ECU 404 ceases to exceed the temperature of the battery 406 detected by the battery temperature sensor 408, the ECU 404 may instruct the actuator 416 to move the vent 414 from the open state to the closed state.

The vehicle 402 may be coupled to a network. The network, such as a local area network (LAN), a wide area network (WAN), a cellular network, a digital short-range communication (DSRC), the Internet, or a combination thereof, connects the vehicle 402 to a remote data server 432. The remote data server 432 may be one or more servers from different service providers. Each of the one or more servers may be connected to one or more databases. A service provider may provide navigational map, weather and/or traffic data to the vehicle 402.

A database is any collection of pieces of information that is organized for search and retrieval, such as by a computer or a server, and the database may be organized in tables, schemas, queries, report, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The navigational map information includes political, roadway and construction information. The political information includes political features such as cities, states, zoning ordinances, laws and regulations, and traffic signs, such as a stop sign, or traffic signals. For example, laws and regulations may include the regulated speed on different portions of a road or noise ordinances. The roadway information includes road features such the grade of an incline of a road, a terrain type of the road, or a curvature of the road. The construction information includes construction features such as construction zones and construction hazards.

The traffic data includes one or more traffic condition features, such as traffic congested areas or accident areas. The traffic data may provide information related to the density and movement of vehicles on a roadway and/or accident locations.

The features, e.g., road features, political features, or traffic data, each have a location that may be identified by map coordinates. The map coordinates may be defined by latitude and longitude coordinates.

The transceiver 430 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 430 may transmit data to and receive data from devices and systems not directly connected to the vehicle 402. For example, the ECU 404 may communicate with the remote data server 432. Furthermore, the transceiver 430 may access the network, to which the remote data server 432 is also connected.

The GPS unit 428 is connected to the ECU 404 and configured to determine location data. The ECU 404 may use the location data along with the map data to determine a location of the vehicle 402. In other embodiments, the GPS unit 428 has access to the map data and may determine the location of the vehicle 402 and provide the location of the vehicle 402 to the ECU 404. The map data may indicate where heat generation locations are. Heat generation locations may be areas where relatively high levels of heat are emitted, compared to surrounding areas. For example, grates, such as sewer grates or grates above underground transportation systems, may emit heat that is dissipated above ground. The map data may indicate where these grates are located, and when the location data from the GPS unit 428 indicates that the vehicle 402 is located over the grate, the ECU 404 may cause the actuator 416 to move the vent 414 to move from the closed state to the open state so that the battery 406 may absorb the heat emitted from the grate (or more generally, the heat generation location).

The memory 434 is connected to the ECU 404 and may be connected to any other component of the vehicle 402. The memory 434 is configured to store any data described herein, such as the map data, the location data, and any data received from the remote data server 432 via the transceiver 430.

The camera 424 may be one or more image or video cameras configured to detect image data. The ECU 404 may be able to determine heat generation locations based on the image data. In some embodiments, the ECU 404 uses machine learning techniques to identify signs of heat being emitted from the ground, such as steam. In some embodiments, the camera 424 is an infrared camera or other heat detecting sensor configured to detect a temperature of a surface. In some embodiments, when a heat generation location is detected, the heat generation located is added to the map data stored in the memory 434.

The weather data received by the transceiver 430 may indicate an expected temperature increase corresponding to the location of the vehicle 402. In some embodiments, the ECU 404 determines an anticipated effective outside temperature based on the weather data. Based on the anticipated effective outside temperature, the ECU 404 may determine whether the vent 414 should be opened at some future time, so that the battery 406 may absorb the heat from outside of the vehicle 402. The anticipated effective outside temperature may be periodically updated, and the determination of a future opening of the vent 414 may also be updated based on updated weather data, updated location data, and updated battery temperature data.

The vehicle 402 also includes a display 422. The display 422 may be part of an infotainment unit and may also present navigation instructions and may also provide a map of the current location of the vehicle 402 and/or a desired destination. The display 422 may include multiple display screens. For example, the display 422 may be two screens— one for displaying a map, and another for displaying a driving mode or settings of the driving mode.

In some embodiments, when the ECU 404 determines an anticipated effective outside temperature based on weather data leading to the opening of the vent 414 at some future time, the display 422 may indicate to the driver or user of the vehicle 402 that electrical energy may be conserved if starting up (or turning on) of the vehicle 402 is delayed until a future time after the battery 406 has absorbed heat from outside of the vehicle 402.

For example, at 8 AM the battery temperature may be 72 degrees and the current outside temperature may be 70 degrees. However, based on the weather data, the ECU 404 anticipates that the effective outside temperature at 8:30 AM will be 78 degrees, and the battery 406 may begin to be warmed up by the outside air and ground surface beginning at 8:15 AM. The display 422 may indicate to the driver that if the driver waits until 8:30 AM to start the vehicle 402, electrical energy may be conserved by the battery 406 being warmed by the environment. If the driver is able to wait until 8:30 AM, the driver may perform other activities until then, and delay use of the vehicle 402 until 8:30 AM.

In some embodiments, the ECU 404 may communicate this information to a mobile device of the driver. The ECU 404 may use the transceiver 430, which may be communicatively coupled to the mobile device of the driver.

The vehicle 402 also includes a speed sensor 418 configured to detect a speed of the vehicle 402. In some embodiments, when the speed of the vehicle 402, as detected by the speed sensor 418, exceeds a speed threshold and the vent 414 is in the open state, a screen (e.g., screen 318) is moved to a deployed state to protect the battery 406 from debris from outside of the vehicle 402.

In some embodiments, when the speed of the vehicle 402, as detected by the speed sensor 418, does not exceed the speed threshold and the vent 414 is in the open state, the screen remains in a retracted state so that the battery 406 may absorb heat from outside of the vehicle 402 with minimal interference.

As used herein, a "unit" may refer to hardware components, such as one or more computer processors, controllers, or computing devices configured to execute instructions stored in a non-transitory memory.

Figure 5:
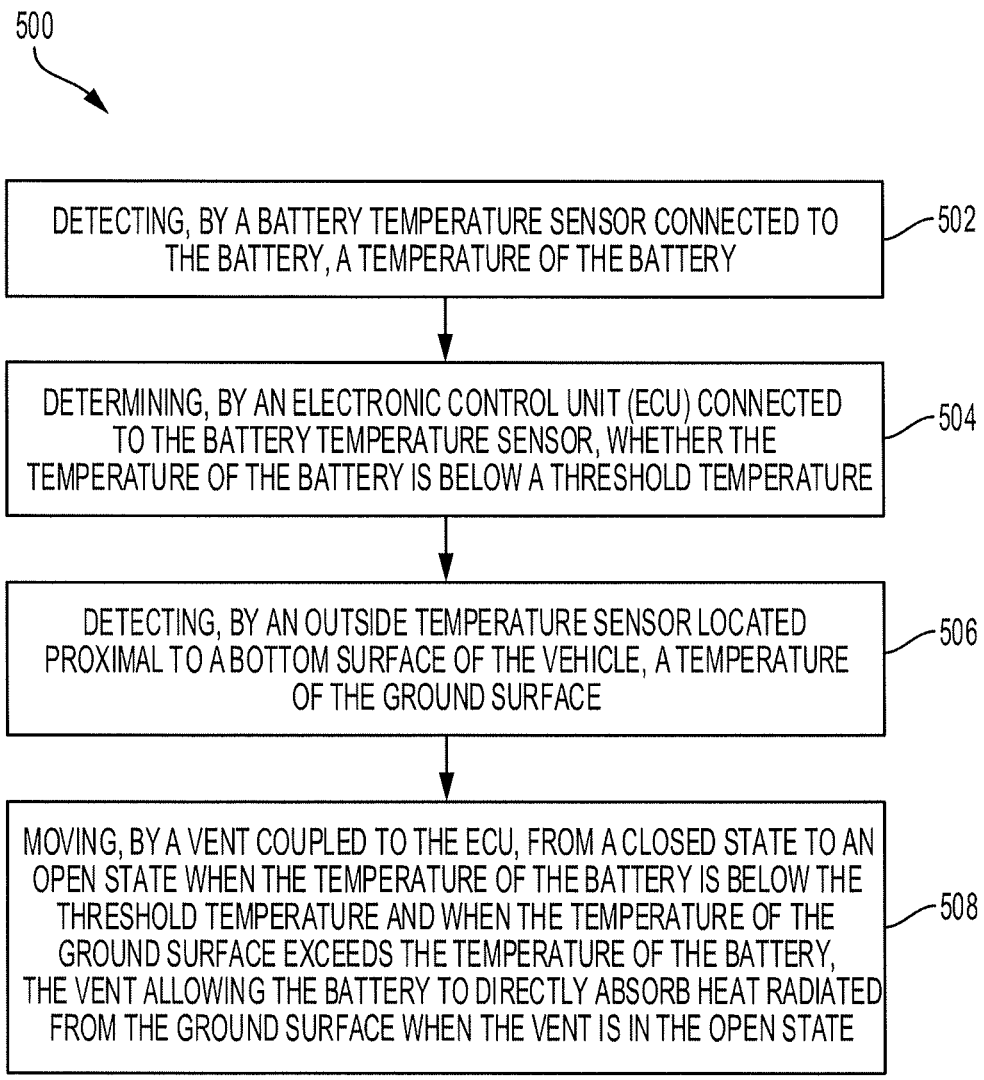
FIG. 5 illustrates a flow diagram of a process performed by the roadway heat absorption system, according to various embodiments of the invention.

FIG. 5 illustrates a flow diagram of a process 500 performed by the roadway heat absorption system, according to various embodiments of the invention.

A battery temperature sensor (e.g., battery temperature sensor 408) detects a temperature of the battery (e.g., battery 406) (step 502). The battery temperature sensor may generate battery temperature data to be communicated to an ECU (e.g., ECU 404).

The ECU receives the battery temperature data and determines whether the temperature of the battery is below a threshold temperature (step 504). The threshold temperature may correspond to the lowest temperature the battery may operate at while maintaining energy efficiency. In many embodiments, when the battery is used when the battery temperature is below the threshold temperature, energy efficiency may be reduced. In some embodiments, the threshold temperature is 5 degrees Celsius (or 41 degrees Fahrenheit).

An outside temperature sensor (e.g., outside temperature sensor 420) detects a temperature of the ground surface below the vehicle (step 506). The outside temperature sensor may generate outside temperature data to be communicated to the ECU. In some embodiments, instead of detecting the temperature of the ground surface below the vehicle, the outside temperature sensor detects the temperature of the air between the battery and the ground surface below the vehicle.

A vent (e.g., vent 414) is moved from the closed state to the open state when the temperature of the battery is below the threshold temperature and when the temperature of the ground surface exceeds the temperature of the battery (step 508). This allows the battery to directly absorb heat radiated from the ground surface when the vent is in the open state.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A battery warming system for a vehicle located on a ground surface, comprising:
    a battery configured to power a motor of the vehicle, the battery located within the vehicle and adjacent to a bottom surface of the vehicle;
    a vent located below the battery and within an opening in the bottom surface of the vehicle, the vent configured to be in an open state or a closed state;
    a screen located between the battery and the ground surface and configured to prevent objects or debris from entering the vehicle when the vent is in the open state, the screen configured to be in a deployed state or a retracted state based on a detected vehicle speed; and
    an electronic control unit (ECU) coupled to the vent and the battery and configured to determine whether a temperature of the battery is below a threshold temperature, and cause the vent to move from the closed state to the open state when the temperature of the battery is, below the threshold temperature to allow the battery to directly absorb heat radiated from the ground surface.

2. The system of claim 1, further comprising a battery temperature sensor connected to the battery and the ECU and configured to detect the temperature of the battery; and
    an outside temperature sensor configured to detect a temperature of the ground surface,
    wherein the ECU is configured to cause the vent to move from the dosed state to the open state when the temperature of the ground surface exceeds the temperature of the battery in addition to the battery being below the threshold temperature, to allow the battery to directly absorb heat radiated from the around surface.

3. The system of claim 1, wherein the ECU is further configured to determine an effective outside temperature, and cause the vent to move from the closed state to the open state when the effective outside temperature exceeds the temperature of the battery in addition to the battery being below the threshold temperature, to allow the battery to directly absorb heat radiated from the around surface.

4. The system of claim 3, further comprising an outside temperature sensor configured to detect a temperature of the ground surface; and
    a wind sensor configured to detect a wind speed below the vehicle,
    wherein the ECU is configured to determine the effective outside temperature based on the temperature of the ground surface and the wind speed below the vehicle.

5. The system of claim 3, further comprising an outside temperature sensor configured to detect a temperature of the ground surface; and
    a solar loading sensor configured to detect a current amount of sunlight,
    wherein the ECU is configured to determine the effective outside temperature based on the temperature of the ground surface and the current amount of sunlight.

6. An electric vehicle located on a ground surface, comprising:
    a bottom surface;
    a battery configured to power a motor of the electric vehicle, the battery located within the electric vehicle and adjacent to the bottom surface;
    a vent located below the battery and, within an opening in the bottom surface, the vent configured to be in an open state or a closed state;
    a screen located between the battery and the ground surface and configured to block objects or debris when the vent is in the open state, the screen configured to be in a deployed state or a retracted state based on a detected vehicle speed; and
    an electronic control unit (ECU) coupled to the vent and the battery and configured to determine whether a temperature of the battery is below a threshold temperature, and cause the vent to move from the closed state to the open state when the temperature of the battery is below the threshold temperature to allow the battery to directly absorb outside heat.

7. The electric vehicle of claim 6, further comprising;
    a battery temperature sensor connected to the battery and the ECU and configured to detect the temperature of the battery; and
    an outside temperature sensor located adjacent to the bottom surface and configured to detect a temperature of air between the ground surface and the battery,
    wherein the ECU is configured to cause the vent to move from the closed state to the open state when the temperature of the air between the ground surface and the battery exceeds the temperature of the battery in addition to the battery being below the threshold temperature, to allow the battery to directly absorb heat from the air between the ground surface and the battery.

8. The electric vehicle of claim 6, wherein the ECU is further configured to determine an effective outside temperature, and cause the vent to move from the closed state to the open state when the effective outside temperature exceeds the temperature of the battery in addition to the battery being below the threshold temperature, to allow the battery to directly absorb heat from the air between the ground surface and the battery.

9. The electric vehicle of claim 8, further comprising;
an outside temperature sensor configured to detect a temperature of the ground surface; and
a wind sensor configured to detect a wind speed,
wherein the ECU is configured to determine the effective outside temperature based on the temperature of the ground surface and the wind speed.

10. The electric vehicle of claim 8, further comprising:
an outside temperature sensor configured to detect a temperature of the ground surface; and
a solar loading sensor configured to detect a current amount of sunlight,
wherein the ECU is configured to determine the effective outside temperature based on the temperature of the ground surface and the current amount of sunlight.

11. A method for warming a battery of an electric vehicle, the method comprising:
detecting, by a battery temperature sensor connected to the battery, a temperature of the battery;
detecting. by an outside temperature sensor, a temperature of a ground surface outside of the vehicle;
determining, by an electronic control unit (ECU), an effective outside temperature based on:
the temperature of the ground surface, and
wind speed below the vehicle detected by a wind sensor or a current amount of sunlight detected by a solar loading sensor:
determining, by the ECU, whether the temperature of the battery is below a threshold temperature and whether the effective outside temperature exceeds the temperature of the battery; and
moving, by a vent coupled to the ECU, from a closed state to an open state when the temperature of the battery is below the threshold temperature and when the effective outside temperature exceeds the temperature of the battery, the vent allowing the battery to directly absorb heat radiated from the ground surface when the vent is in the open state.

12. The method of claim 11, further comprising;
detecting, by an outside temperature sensor, a temperature of the ground surface, and
wherein the vent moves from the closed state to the open state when the temperature of the ground surface exceeds the temperature of the battery in addition to the battery being below the threshold temperature, to allow the battery to directly absorb heat radiated from the ground surface.

13. The method of claim 11, further comprising determining, by the ECU, an effective outside temperature, and causing the vent to move from the closed state to the open state when the effective outside temperature exceeds the temperature of the battery in addition to the battery being below the threshold temperature, to allow the battery to directly absorb heat radiated from the ground surface.

14. The method of claim 11, further comprising:
detecting, by the ECU, whether the vehicle is moving and the vent is in the open state; and
moving, by a screen coupled to the ECU and located between the battery and the ground surface, from an retracted state to a deployed state when the vehicle is moving and the vent is in the open state, the screen preventing objects or debris from entering the vehicle when the vent is in the open state.

\* \* \* \* \*